United States Patent [19]

Takahashi

[11] Patent Number: 4,589,505

[45] Date of Patent: May 20, 1986

[54] PRINTER WITH TWO PRINTING CAPABILITIES

[75] Inventor: Naoki Takahashi, Kyoto, Japan

[73] Assignee: Kabushiki Kaisha Ishida Koki Seisakusho, Kyoto, Japan

[21] Appl. No.: 621,385

[22] Filed: Jun. 18, 1984

[30] Foreign Application Priority Data

Jun. 18, 1983 [JP] Japan .............................. 58-93961[U]

[51] Int. Cl.[4] ...................... G01G 23/38; G01D 9/00; G01D 15/28
[52] U.S. Cl. ........................................... 177/2; 346/9; 346/138
[58] Field of Search ...................................... 177/2-13; 346/9-12, 138; 156/DIG. 33

[56] References Cited

U.S. PATENT DOCUMENTS

| 4,101,366 | 7/1978 | Teraoka et al. | 177/3 X |
| 4,158,205 | 6/1979 | Jenkins, Jr. | 346/136 |
| 4,301,878 | 11/1981 | Soe | 177/5 |
| 4,440,248 | 4/1984 | Teraoka | 177/4 |

FOREIGN PATENT DOCUMENTS 0036288 9/1981 European Pat. Off.
2010186 6/1979 United Kingdom.
2072101 9/1981 United Kingdom.

Primary Examiner—George H. Miller, Jr.
Attorney, Agent, or Firm—Staas & Halsey

[57] ABSTRACT

A printer is used for printing the output of an electronic balance, for example, having a printing roller as a component of a printing unit. The printing roller is adapted to be driven by a motor and to feed the printing sheet by its own rotation when a printing head presses the printing sheet against the printing roller and impresses a given print on the printing sheet.

9 Claims, 4 Drawing Figures

4,589,505

PRINTER WITH TWO PRINTING CAPABILITIES

BACKGROUND OF THE INVENTION

This invention relates to improvements in and concerning a printer for use in an electronic balance, for example.

The electronic balance is a device for weighing a given object such as an article of commerce. The latest version of the electronic balance is internally provided with a printer such that when the object is weighed, the printer will issue a label on which the weight of the object and the name of the object as a commodity are printed. This label is fit for application to the wrap enclosing the object. The printed label thus issued by the printer comes from a rolled strip of carrier paper which has a multiplicity of blank labels stuck to the carrier paper through the medium of a silicone resin coating deposited on the carrier paper in advance. The roll holding the supply of blank labels between its successive plies is set in place inside the printer and the leading end of the carrier paper is paid off the roll and inserted in the slit between the printing head and the printing pad. The print on the label is produced between the printing head and the printing pad. The printed label is moved out of this slit and thrust out of the enclosure of the printer, to be removed from the carrier paper and applied to the weighed object. The carrier paper stripped of the label is taken up inside the printer. The advance of the series of blank labels is effected by the motion produced when the carrier paper is thus taken up.

On the part of the electronic balance, there are times when a receipt indicating the sum payable for the weighed object is required to be issued to a client separately of the label mentioned above. The printer of this class is designed so as to hold therein a rolled strip of plain paper called a journal sheet and, in case of need, to cause this journal sheet to be drawn out of the roll and forward to a printing mechanism by a feeding mechanism disposed near the printing mechanism, printed by the printing mechanism, and then discharged from the enclosure of the printer.

The electronic balance, depending on the use for which it is intended, may be required to combine the function of label printing and that of journal sheet printing in one. Since the label printer and the journal sheet printer have dissimilar configurations, the conventional electronic balance requiring a combination of the two functions incorporates both a label printer and a journal sheet printer. Consequently, this electronic balance suffers from a disadvantage that the joint accommodation of these printers adds notably to the structural complexity and the dimensional bulkiness of the electronic balance and, at the same time, to the price of the electronic balance.

SUMMARY OF THE INVENTION

An object of this invention is to provide a printer which combines the mechanism of label printing and that of journal sheet printing.

Another object of this invention is to provide a printer which combines the mechanism of label printing and that of journal sheet printing and which is used in an electronic balance.

Yet another object of this invention is to provide a printer which has a printer drive mechanism of simple structure.

According to this invention, there is provided a printer comprising a roll holder, a printing unit, and a winding unit, the printing unit being provided with a printing roller for receiving a printing head and, at the same time, driving the printing roller.

This invention allows the journal sheet which has no carrier paper to be taken up on the winding unit, to be similarly drawn out of its roll and forwarded to the printing unit.

While a label printer generally is required to drive a winding roller of the carrier paper winding unit through the medium of a slide clutch, this invention has a winding roller and a printing roller which are adapted to be driven by one common belt revolved by one motor.

In accordance with this invention, since the printing unit is provided with the printing roller for receiving the printing head and, at the same time, is adapted to drive the printing roller as described above, one printer is able to function as a label printer and also as a journal printer. The user, therefore, is allowed to use this printer selectively as a label issuing machine or as a receipt issuing machine, depending on occasions. In the aspect of manufacture, the production cost of this printer is notably low because the manufacturer is not required to produce both label printers and journal printers separately but to produce printers of one type.

Particularly this invention permits a reduction in the production cost in respect that the printing roller is driven in conjunction with the drive shaft of the winding roller by one belt being revolved by one motor and, as the result, the total number of component parts is proportionately small.

DESCRIPTION OF THE PREFERRED EMBODIMENTS

Now, the present invention will be described below with reference to an embodiment thereof in the form of a printer integrally incorporated in an electronic balance.

Figure 1:
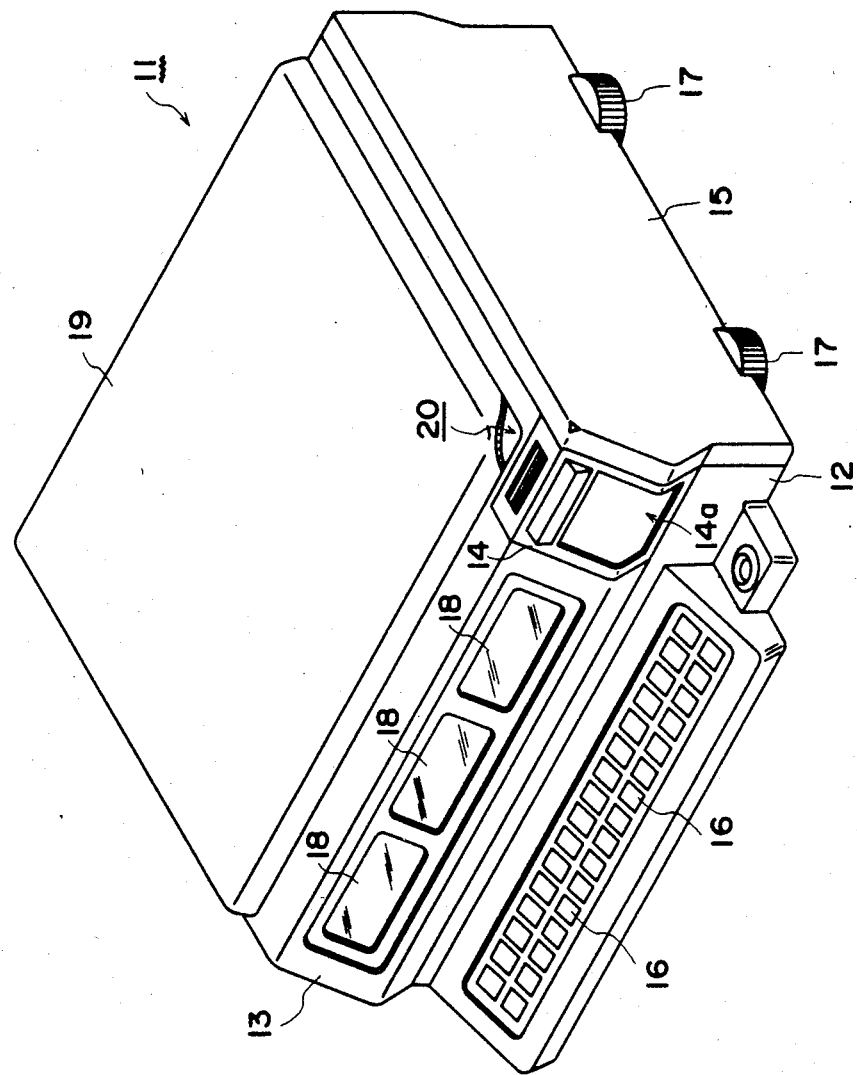
FIG. 1 is a perspective view of an electronic balance in which an embodiment of this invention is utilized.

FIG. 1 represents an appearance of the electronic balance. The housing of the electronic balance 11 comprises a lower case 12, an upper case 13, a printer cover 14 removably attached to one lateral portion of the front panel of the upper case 13, and a detachable side cover 15 covering the lateral side of the housing bordering on the printer cover 14 side.

On the front side of the lower case 12, there are arranged various keys 16 including the 10-keys used for injecting data such as unit price, tare, and weight of the object being weighed. At the four corners of the lower side of the lower case 12, legs 17 adapted to adjust the horizontality of the balance are disposed one each. On the front side and the rear side (which is not shown) of the upper case 13, display units 18 adapted to indicate digitally the unit price, weight, and total price of the weighed object are disposed.

Further, a weighing plate 19 is disposed on the upper case 13. As a given object is placed on this weighing plate 19, the weight of this object is scaled by a load cell (not shown) disposed below the weighing plate 19. The weight thus found is displayed on the display units 18 in conjunction with the total price of the object which is calculated based on the unit price and other input data fed in through the keys 16. Inside the housing constructed as described above, a printer 20 is built in on the lateral side thereof to which the printer cover 14 and the side cover 15 are attached.

Now, the construction of this printer 20 will be described with reference to FIG. 2.

The component members of the printer 20 are disposed on a printer frame 21 which is set upright on the lower case 12. To be specific, on one side 21a (the side opposed to the side cover 15) of the printer frame 21, a roll support unit 22 is disposed on the righthand side and a printing unit 23 on the lefthand side respectively relative to the drawing in FIG. 2. A sheet guide unit 24 is interposed between the roll support unit 22 and the printing unit 23 and a winding unit 25 is disposed below the printing unit 23. A motor 26 is set in place below the sheet guide unit 24. A label or receipt outlet 14a is provided on the printer cover 14 and is situated in front of the printing unit 23.

The printing unit 23 is composed of printing head support means 27 and printing roller support means 28. The printing head support means 27 is provided with a printing head 29. On the printing roller support means 28, a printing roller 30 adapted to receive the printing head 29 is pivotally supported. The winding unit 25 has a winding roller 32 pivotally supported on a drive shaft 31 through the medium of a clutch mechanism (not shown). To the printing roller 30 and the winding roller drive shaft 31 are respectively attached pulleys 33, 34 on the other side of the printer frame (the side in the rear of the drawing). One belt 36 is passed round these pulleys 33, 34 and a pulley 35 which is fitted to the rotary shaft of the motor 26.

The printing head support means 27 has a printing head 29 supported below a retainer plate 38 swingably supported on a frame 37 and the retainer plate 38 is provided with a lever 39 and a lock pin 40 adapted to move jointly with the lever 39. When the lever 39 is drawn out, the lock pin 40 is released from a notch 37a formed in the frame 37 and the retainer plate 38 and the printing head 29 are swung upwardly about a fulcrum 42 by a spring 41. When the retainer plate 38 is pushed down while the printing head 29 remains in its upper position, the printing head 29 is forced into contact with the printing roller 30. In this condition, the lock pin 40 is locked by being brought into engagement with the notch 37a in the frame 37.

The printing roller support means 28 is provided in front of the printing roller 30 with a label peeling shaft 43 which is formed by removing the upper half of a horizontal round bar so as to present a semicircular cross section. The printing head support means 27 and the printing roller support means 28 are attached in the manner of a cantilever to the printer frame 21 so that when the printing head 29 is swung upwardly, the gap between the printing head 29 and the printing roller 30 will be opened on the side cover 15 side (on the front side relative to the drawing) in order for the label sheet to be mounted laterally relative to the direction of its feed. The sheet guide unit 24 is provided with a sensor 44 adapted to take count of the passing blank labels stuck to the label sheet or adjust the timing of the label feeding and that of the printing.

Figure 2:
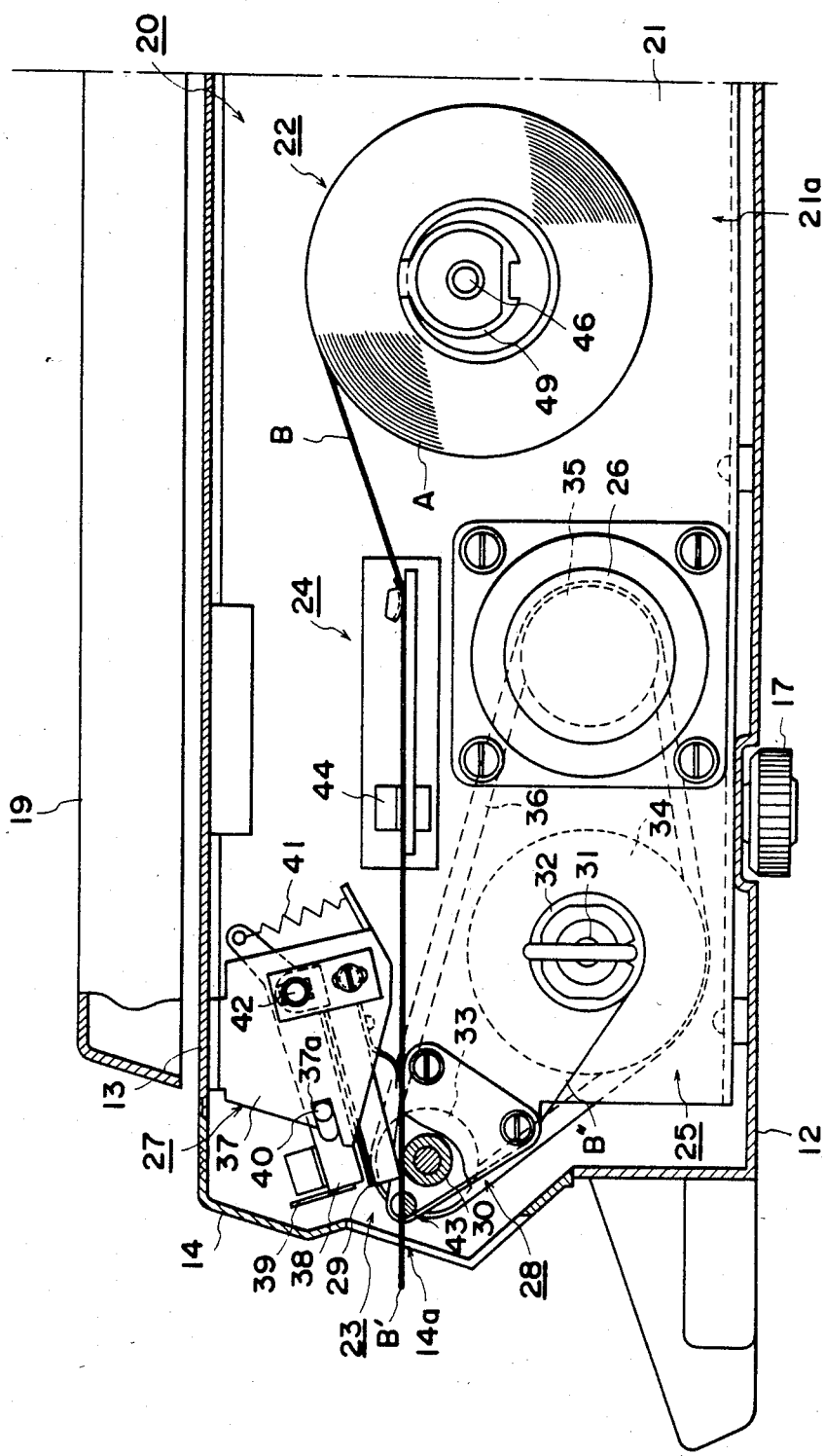
FIG. 2 is an enlarged side view illustrating the condition in which the printer incorporated in the electronic balance is in the process of being used as a label printer.

In the arrangement described above, a strip of label sheet B paid off a sheet roll A mounted on the roll support unit 22, as illustrated in FIG. 2, is forwarded through the sheet guide unit 24 to the printing unit 23. In the printing unit 23, while the label sheet B is in the process of passing the interface between the printing roller 30 and the printing head 29 which presses against the printing roller 30, the printing head 29 impresses a prescribed set of characters such as, for example, those indicating the weight, the price, etc. of the object placed on the weighing plate 19 illustrated in FIG. 1, on the blank label stuck to the sheet B. Then, the label B' is peeled off the support paper B" while the course of advance of the sheet B is changed by an acute angle from the horizontal forward to the vertical downward direction by the label peeling shaft 43. The label B' is withdrawn through the outlet 14a and the support paper B" is taken up on the winding unit 25.

Figure 3:
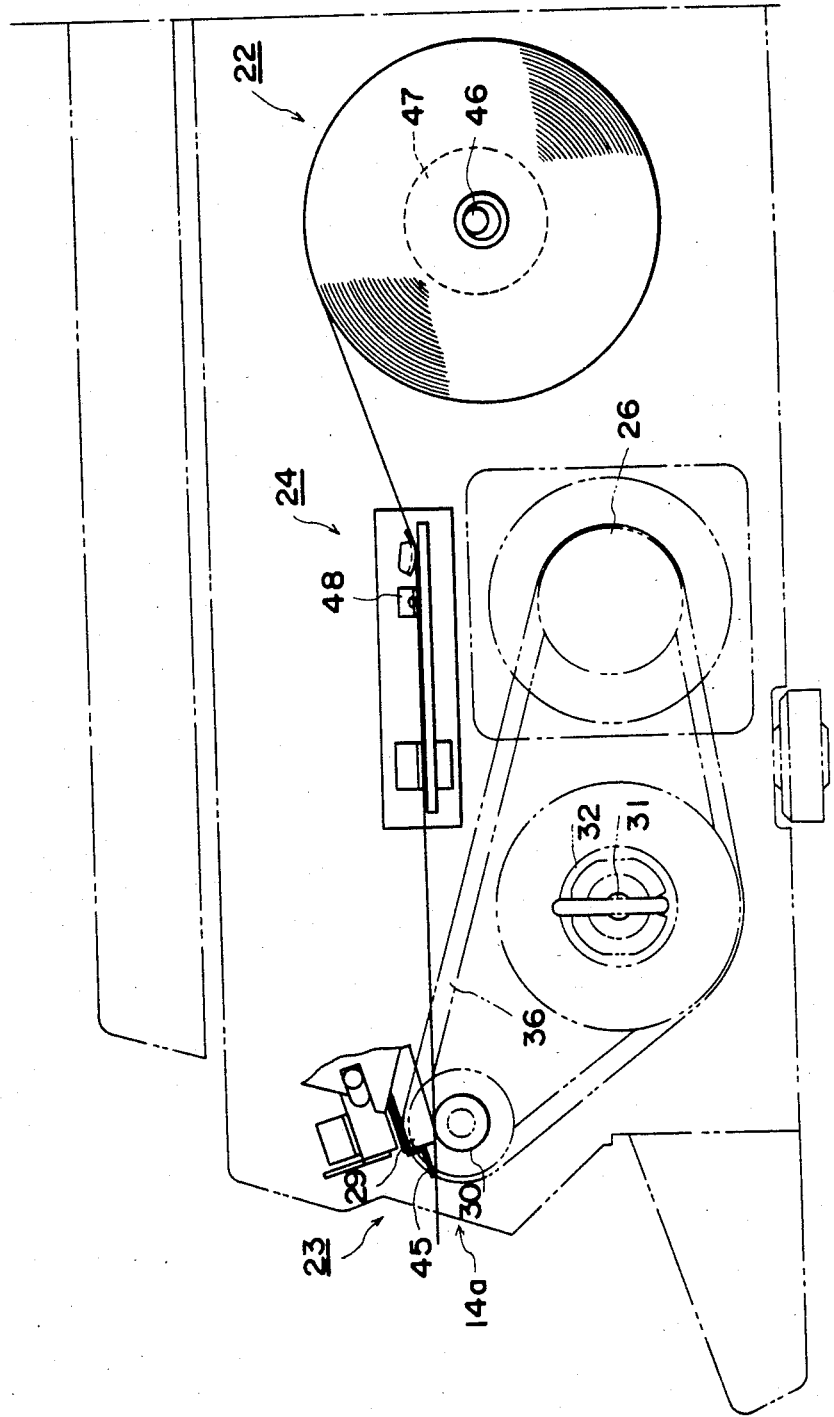
FIG. 3 is an enlarged schematic side view illustrating the condition in which the printer is in the process of being used as a journal printer.

In accordance with the construction described above, the printer can be also used as a journal printer because the printing roller 30 is driven by the motor 26 through the medium of the belt 36 and this printing roller 30 serves to feed the sheet. Specifically, a roll of journal sheet is mounted on the roll support unit 22, as illustrated in FIG. 3, and the leading end of the journal sheet paid off the roll support unit 22 is passed through the guide unit 24 and inserted between the printing head 29 and the printing roller 30 within the printing unit 23. Consequently, this sheet is driven by the printing roller 30, then printed and released out of the outlet 14a of the printer cover 14. In this printing operation, the drive shaft 31 and the winding roller 32 in the winding unit 25 are producing idle rotation.

When the journal sheet is used, the printed portion of the journal sheet must be torn off the rest of the sheet each time the printing is made. For this purpose, a cutter 45 is disposed in front of the printing head 29 as illustrated in FIG. 3. This cutter 45 may be attached to the balance in advance because it offers absolutely no obstruction to the use of the label sheet.

Figure 4:
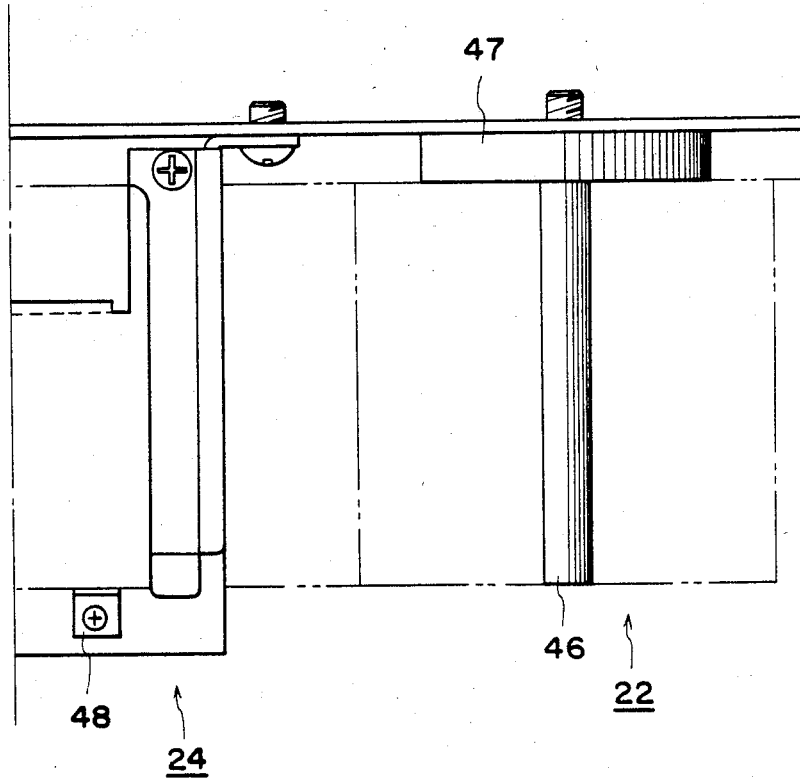
FIG. 4 is a plan view of a roll support unit and a sheet guide unit appearing in FIG. 3.

Further, since the label sheet and the journal sheet generally have different widths, a spacer 47 is attached to the base of a support core 46 in the roll support unit 22 and an auxiliary sheet guide member 48 is attached to the sheet guide unit 24, as illustrated in FIG. 4, when the sheet of a smaller width is put to use.

Further, in the case of the label sheet, the roll of label sheet has a larger core because the label sheet has a multiplicity of blank labels stuck to the surface. When the label sheet is put to use, therefore, a roll support tube 49 of a larger diameter is attached to the support core 46 of the roll support unit 22 as illustrated in FIG. 2.

What we claim is:

1. A printer provided with a roller support unit for supporting a printing sheet, comprising:
   a printing unit, for printing on the printing sheet, including
   a printing roller and
   a printing head for pressing the printing sheet against said roller and impressing print on the printing sheet;

a winding unit having a winding roller provided with a slide clutch; and a motor for driving said printing roller and driving said winding roller through said slide clutch.

2. A printer according to claim 1, further comprising a belt, revolved by said motor for driving said printing roller and said winding roller.

3. A printer, accommodated in an electronic balance having an output, provided with a roller support unit for supporting a printing sheet, comprising:

a printing unit, for printing on the printing sheet, including a printing roller and a printing head for pressing the printing sheet against said printing roller and impressing on the printing sheet information received from the output of said electronic balance;

a winding unit, having a winding roller provided with a slide clutch for winding the printing sheet after said printing; and a motor for driving said printing roller and driving said winding roller through said slide clutch.

4. A printer according to claim 3, further comprising a belt, revolved by said motor for driving said printing roller and said winding roller.

5. A printer according to claim 4, further comprising a label peeling shaft, wherein the printing sheet is a label sheet having a plurality of labels removably affixed to the label sheet, wherein the label peeling shaft removes the labels from the label sheet after the label sheet passes through the printing unit and wherein the winding unit winds the label sheet after the labels are removed from the label sheet.

6. A printer according to claim 4, wherein the printing sheet is a journal sheet which is led out of said electronic balance after passing through the printing unit.

7. A printer, accommodated in an electronic balance having an output, for printing on a printing sheet formed in a roll, comprising:

a frame;

a roll support unit, attached to the frame, for supporting the printing sheet roll;

a sheet guide unit, attached to the frame;

a printing roller;

printing roller support means, attached to the frame, for supporting the printing roller;

a printing head for pressing the printing sheet against the printing roller and impressing information on the printing sheet in accordance with the output of the electronic balance;

printing head support means, attached to the frame, for supporting the printing head;

a winding roller, rotatably attached to the frame, for taking up the printing sheet when the printing sheet is a label sheet; and a motor, attached to the frame, for driving the printing roller and driving the winding roller through a slide clutch.

8. A printer according to claim 7, further comprising a label peeling shaft, wherein the printing sheet is a label sheet having a plurality of labels removably affixed to the label sheet, and the label peeling shaft removes labels from the label sheet.

9. A printer according to claim 7, wherein the printing sheet is a journal sheet and wherein the journal sheet is led out of the printer after having information impressed thereon.

* * * * *